(12) United States Patent
Hell et al.

(10) Patent No.: US 6,507,032 B1
(45) Date of Patent: Jan. 14, 2003

(54) STORAGE PHOSPHOR PANEL WITH INCREASED LUMINOUS EFFICIENCY

(75) Inventors: Erich Hell, Erlangen (DE); Manfred Fuchs, Nürnberg (DE); Detlef Mattern, Erlangen (DE)

(73) Assignee: Agfa-Gevaert, Mortsel (BE)

( * ) Notice: Subject to any disclaimer, the term of this patent is extended or adjusted under 35 U.S.C. 154(b) by 30 days.

(21) Appl. No.: 09/716,203

(22) Filed: Nov. 21, 2000

(30) Foreign Application Priority Data

Nov. 23, 1999 (DE) .......................................... 199 56 270

(51) Int. Cl.[7] ................................................ G03B 42/02
(52) U.S. Cl. ..................................................... 250/484.4
(58) Field of Search ....................................... 250/484.4

(56) References Cited

U.S. PATENT DOCUMENTS 4,800,276 A * 1/1989 Noguchi ..................... 250/586
5,208,459 A * 5/1993 Morrone et al.
5,523,584 A * 6/1996 Celis et al. ............... 250/484.4

FOREIGN PATENT DOCUMENTS

DE 197 52 925 A1 * 6/1999
JP 6-326285 A * 11/1994

* cited by examiner

Primary Examiner—Constantine Hannaher
Assistant Examiner—Shun Lee
(74) Attorney, Agent, or Firm—Breiner & Breiner, L.L.C.

(57) ABSTRACT

A storage phosphor panel having a storage phosphor layer, characterized in that a focusing layer (8) which comprises a multiplicity of adjacent microlenses (9) is incorporated in said storage phosphor panel and forms an outer surface of said panel.

4 Claims, 1 Drawing Sheet

STORAGE PHOSPHOR PANEL WITH INCREASED LUMINOUS EFFICIENCY

FIELD OF THE INVENTION

The invention relates to a storage phosphor panel for radiography systems having a storage layer which is arranged on a support panel and whose image information, excited by a stimulation radiator, is radiated as information light radiation at another frequency.

BACKGROUND OF THE INVENTION

In a conventional radiographic system an X ray radiograph is obtained by X rays transmitted image-wise through an object and converted into light of corresponding intensity in a so called intensifying screen (X ray conversion screen) wherein phosphor particles absorb the transmitted X rays and convert them into visible light and/or ultraviolet radiation to which a photographic film is more sensitive than to the direct impact of X rays.

According to another method of recording and reproducing an X ray pattern disclosed e.g. in U.S. Pat. No. 3,859,527 a special type of phosphor is used, known as a photostimulable phosphor, which being incorporated in a panel is exposed to incident patternwise modulated X rays and as a result thereof temporarily stores therein energy contained in the X ray radiation pattern. At some interval after the exposure, a beam of visible or infrared light scans the panel to stimulate the release of stored energy as light that is detected and converted to electrical signals which are processed to produce a visible image. For this purpose, the phosphor should store as much as possible of the incident X ray energy and emit as little as possible of the stored energy until stimulated the scanning beam. This is called "digital radiography" or "computed radiography".

During the scanning of storage phosphor panels with a stimulation laser, the area used for imaging is scanned line by line. In this case, the stimulation light can be focused relatively easily to the required pixel size, in which case the stimulation can be effected in spot form, in so called "flying spot scanners", or in line form in a line CCD readout (charge coupled device). The actual image information, that is to say the emitted light, leaves the image panel in the form of light of a different wavelength. It can be demonstrated that, even with phosphors which are structured in needle form, the angular distribution of the emitted light is directed forwards only to a slightly greater extent than the light emanating from a diffusively scattering layer (Lambertian radiator).

When considering the signal chain, it is crucial that a second quantum bottleneck is not created at any point in the system. The collection efficiency of the light detector is particularly critical, since any intensity of the emitted signal that is lost here, e.g., as a result of mismatch, cannot be recovered at a later point.

The known storage phosphor panels have hitherto usually been scanned by a "flying spot" laser in spot form in the red spectral region. A single photomultiplier with an optical waveguide coupled to it collects the emitted light. With this geometry, owing to the spotlike nature of the emitting source, the optical waveguide can be matched very favourably to the Lambertian radiation characteristic.

With a new generation of storage panels with CCD read-out lines, however, this problem is difficult to solve. Particularly with a version in which stimulation and read-out take place at the same side, the larger distance of the CCD detector from the layer surface results in a reduced effective aperture and thus in a distinct reduction of the collecting efficiency. It has been disclosed to use microlenses in the reader for stimulated light of storage phosphor plates for focusing the emitted light onto the CCD. Such disclosures are found in e.g., in DE-A-1 97 52925 and in U.S. Pat. No. 5,208,459. In these disclosures, the microlenses are placed between the storage phosphor panel and the CCD's, so that the reader still has to be larger than desired because it has to accommodate the lens systems between the storage plate the CCD. Thus means and ways to further reduce the dimensions of a reader for storage phosphor plates are still desired.

OBJECTS AND SUMMARY OF THE INVENTION

It is an object of the invention to provide a storage phosphor panel making it possible to reduce the dimensions of the reader needed to read (i.e. stimulate the plate and read the emitted light) the phosphor plate.

It is an object of the invention to provide a storage phosphor panel having a particularly high collecting efficiency irrespective of the operating mode in transmitted light operation or reflected light operation.

It is a further object of the invention to provide a storage phosphor panel with a particularly high collection efficiency when the reading of the stimulated light proceeds with a CCD-light detector.

Further advantages, features and details of the invention emerge from the following description of an exemplary embodiment and with reference to the drawings.

The objects of the invention are realised by providing a storage phosphor panel having a storage phosphor layer, characterised in that a focusing layer (8) which comprises a multiplicity of adjacent microlenses (9) is incorporated in said storage phosphor panel and forms an outer surface of said panel.

Preferably said storage phosphor panel comprises a support and the storage phosphor layer is present on said support and the multiplicity of adjacent microlenses (9) forms an outer surface of the panel at the phosphor layer side of the panel.

DETAILED DESCRIPTION OF THE INVENTION

Figure 1:
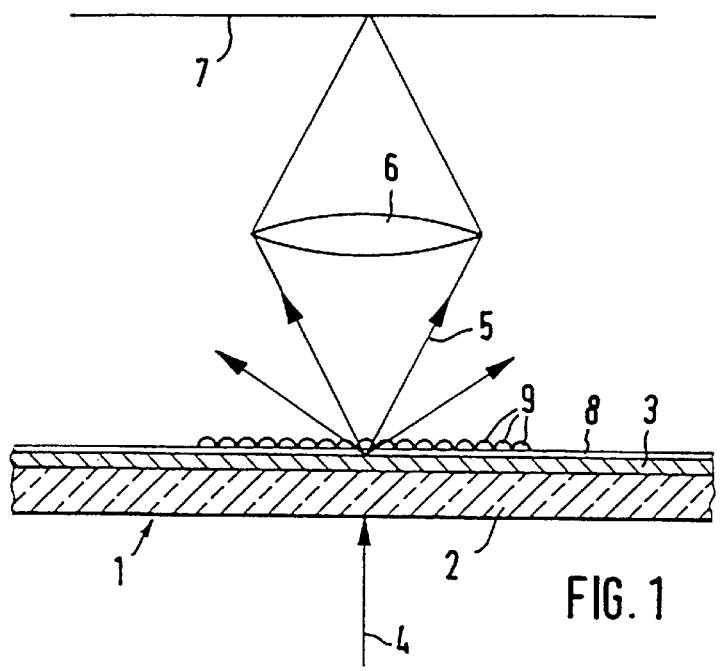
FIG. 1 shows a schematic illustration of the structure of an apparatus for reading out a storage phosphor panel.

It was found that by incorporating a microlens array in a storage phosphor panel so as to have this array forming an outermost layer, this array could function as a focussing layer thereby altering the Lambertian emission characteristic of the screen, making it more forwardly directed. Even when the distance of the CCD detector from the layer surface, as is the case especially for the reflected light principle, exhibits an increased distance from the phosphor screen side, or when the aperture of the detector cannot be too large for other reasons, a high collection efficiency is still guaranteed because of the focussing of the emitted light. Thus in order to maximise the signal level in the CCD, simple matching to the aperture of the light receiver is effected by changing the radiation characteristic of the light emitted from the storage panel.

Preferably, the focusing layer in a storage phosphor panel according to the invention has microlenses whose size is equal to or smaller than the pixel size of the storage layer for making the radiation characteristic even more directional. Preferably, the individual microlenses are smaller than the pixel size of the storage phosphor panel preferably by a multiple. The pixel size of the storage phosphor panel is largely determined by the dimensions of the spot of stimulating radiation. This means that the pixel size of the storage phosphor screen is something like 100 µm and lower.

Since, for the detection of the emitted light, it is important that the focussing, i.e., the altering the Lambert emergence characteristic of the emitted radiation, already takes place directly upon emergence from the storage layer, the focusing layer, i.e. the array of microlenses, is preferably positioned as close as possible to the storage phosphor layer, this means that the array of microlenses is either directly contacting the storage phosphor layer or is only separated from the said storage layer by a (transparent) protective layer.

A storage screen, according to this invention, wherein a focussing layer, i.e. an array of microlenses, is Incorporated and forms an outer layer of the storage phosphor screen or panel, can be produced in several ways.

The screen or panel can be made by applying a coating solution of a storage phosphor in a binder on a substrate to form a storage phosphor layer and then by applying, e.g., by laminating , the focussing layer (array of microlenses) on to the storage phosphor layer. In this case the focussing layer acts also as a protective layer. A screen or panel, according to the invention, can be made by applying a coating solution of a storage phosphor in a binder on a substrate to form a storage phosphor layer, applying a protective layer on top of the phosphor layer and then by applying, e.g., by laminating , the focussing layer (array of microlenses) on to the storage phosphor layer. The focussing layer can be applied and attached to the screen by means of a thermo- or pressure-sensitive adhesive layer.

The screen or panel can be a self supporting layer of a storage phosphor in a binder, wherein on said self supporting layer a focussing layer (array of microlenses) is applied.

A storage phosphor screen of this invention can also be prepared by coating a coating solution of a storage phosphor in a binder on the flat side, i.e. the side opposite to the lens side, of a microlens array and then the storage phosphor layer can be provided with a protective layer.

A storage phosphor screen of this invention can also be prepared by vapour deposition of the phosphor. In this case the phosphor can be vapour deposited on a substrate and the microlens array (focussing layer) applied on top of the vapour deposited phosphor or the phosphor can be vapour deposited on the flat side, i.e. the side opposite to the lens side, of a microlens array and then the storage phosphor layer can be provided with a protective layer.

The production of the focussing layer with the microlenses can be carried out in a manner known per se for example by a focussing layer made of plastic and applied to the storage layer being provided with the microlenses by anisotropic etching. The microlens array can comprise refractive lenses as well as diffractive lenses. An overview of production methods for microlens arrays can be found in Pure and Applied Optics, volume 6, Number 6 of November 1997 on page 599 to 699. Microlens arrays can also be prepared by ink jet printing. Such methods have been disclosed by W. R. Cox, D. J. Hayes, T. Chen, R. F. Hoenigman, D. L. MacFarlane, in (a) articles entitled "Microjet Printing for Low Cost Optical Interconnects", published in Proceedings, ISHM '96, Minneapolis, Minn., October 1996 and by W. Royall Cox, Ting Chen, Chi Guan, Donald J. Hayes and Rick E. Hoenigman, Brian T. Teipen and Duncan L. MacFarlane, in a article titled "Micro-jet Printing of Refractive Microlenses", published in Proceedings, OSA Diffractive Optics and Micro-Optics Topical Meeting, Kailua-Kona, Hi., June 1998.

Figures 2A, 2B:
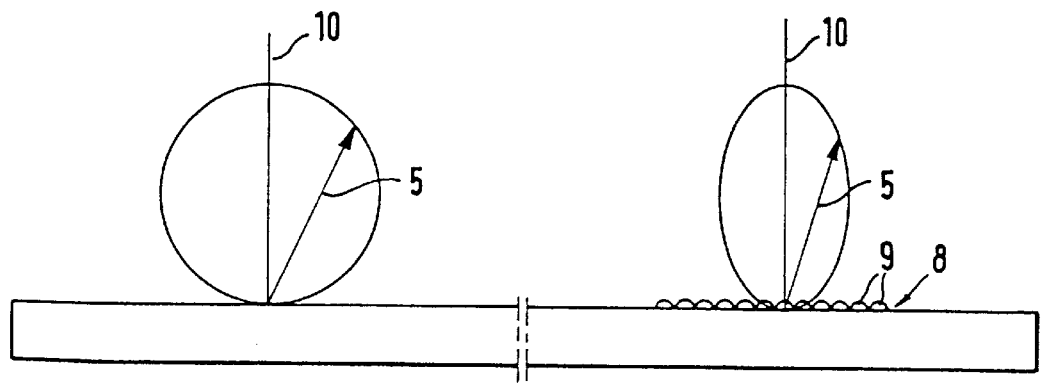
FIGS. 2a and 2b show the radiation characteristic of the storage layer of a storage phosphor pane, first without and then with the microlenses according to the invention.
Figure 3:
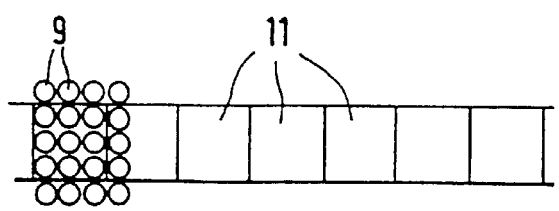
FIG. 3 shows a schematic partial view of a pixel line with the substantially smaller microlenses of the focusing layer arranged above it.

In FIG. 1, no.1 designates a storage phosphor panel, comprising a support panel or a substrate 2 and the storage layer 3 applied thereto. In the case of the exemplary embodiment of a read-out of the storage phosphor panel in transmitted light operation as shown in FIG. 1, the spot or line scanning is effected by the scanning light 4 from a stimulation laser (not shown) from the free rear side of the support panel 1, while the emitted light 5 containing the image information emerges from the storage layer 3 and impinges via the aperture 6 on the detector 7, that is to say the CCD for example. In this case, the aperture 6 may be a lens or alternatively a fibre optic arrangement. In view of the essentially Lambertian radiation characteristic of the storage layer 3, it is critical that whenever the aperture cannot be arranged directly adjacent to the emergence side of the storage layer, which is the case in most applications and particularly in reflected light operation, only part of the emitted light can be captured and fed to the CCD. The collecting efficiency is thus distinctly reduced. In FIGS. 2a and 2b, the radiation characteristic of the emitted light 5 is illustrated firstly with an uncovered emitting layer and, in the case of FIG. 2b, with the use of a focussing layer 8 with microlenses 9 according to the invention. It is evident in this case that, by virtue of the microlenses 9 according to the invention, the radiation characteristic is distinctly narrowed towards the normal 10 to the surface, which ensures, even with a relatively small aperture, that essentially all of the emitted light can be utilised and fed to the CCD. Furthermore, in FIG. 3, which schematically indicates a pixel line with the individual pixels 11, the ratio of the pixel size to the size of the microlenses can be discerned. The microlenses 9, which are arranged close together on the focussing layer, which, for its part, is in turn arranged preferably directly on the storage layer 3, are smaller by a multiple than the size of a pixel 11, so that light of adjacent pixels is not mingled via the focusing by these microlenses. The resolution is thus not affected by the increased luminous efficiency.

The invention is not restricted to the exemplary embodiment illustrated. In addition to the possibility of only arranging the microlenses on a protective layer covering the storage layer, the invention's storage phosphor panel with microlenses placed is suitable not only for transmitted light operation but also in the same way for reflected light operation. The extra amount of emitted light that can be forwarded to the CCD by applying the invention procedure is of even larger importance in this latter reflected light operation.

What is claimed is:

1. A storage phosphor panel comprising a storage phosphor layer and a focusing layer, said focusing layer comprising a multiplicity of adjacent microlenses, wherein said focusing layer is incorporated in said storage phosphor panel and forms an outer surface of said storage phosphor panel.

2. A storage phosphor panel according to claim 1, wherein between said storage phosphor layer and said focusing layer a transparent protective coating is present.

3. A storage phosphor panel according to claim 1, wherein said storage phosphor layer has a pixel size of A and said microlenses are smaller, by a multiple, than said pixel size of the storage phosphor layer.

4. A storage phosphor panel according to claim 2, wherein said storage phosphor layer has a pixel size of A and said microlenses are smaller, by a multiple, than said pixel size of the storage phosphor layer.

* * * * *

UNITED STATES PATENT AND TRADEMARK OFFICE
CERTIFICATE OF CORRECTION

PATENT NO. : 6,507,032 B1
DATED : January 14, 2003
INVENTOR(S) : Erich Hell et al.

It is certified that error appears in the above-identified patent and that said Letters Patent is hereby corrected as shown below:

<u>Title page,</u>
Item [57], ABSTRACT should read as follows -- A storage phosphor panel is described having a storage phosor layer and, as an outer surface of the panel, a focusing layer which includes a mutiplicity of adjacent microlenses --.

<u>Column 3,</u>
Line 25, "Incorporated" should read -- incorporated --.

Signed and Sealed this

Thirteenth Day of May, 2003

JAMES E. ROGAN
*Director of the United States Patent and Trademark Office*